United States Patent [19]

Gutner

[11] 4,068,333

[45] Jan. 17, 1978

[54] CANOPY FRAME FOR BED

[76] Inventor: Kenneth H. Gutner, 3285 Dato, Highland Park, Ill. 60035

[21] Appl. No.: 669,304

[22] Filed: Mar. 22, 1976

Related U.S. Application Data

[63] Continuation-in-part of Ser. No. 631,042, Nov. 12, 1975, Pat. No. 4,004,306.

[51] Int. Cl.² .................... F16B 7/10; A47C 29/00
[52] U.S. Cl. .............................. 5/362; 135/5.2; 403/329
[58] Field of Search ............... 5/362; 135/5.2; 403/329, 333, 334; 182/2

[56] References Cited

U.S. PATENT DOCUMENTS

| | | | |
|---|---|---|---|
| 3,409,858 | 11/1968 | Krehbiel | 403/329 |
| 3,741,225 | 6/1973 | Gunter | 5/362 |
| 3,947,191 | 3/1976 | Milner | 403/334 |

Primary Examiner—Casmir A. Nunberg
Attorney, Agent, or Firm—Tilton, Fallon, Lungmus & Chestnut

[57] ABSTRACT

A canopy frame for a bed constructed of resilient plastic material with the longitudinally extending members connecting cross tie rods, the longitudinal members each including two parts telescopically related via a stabilized joint.

7 Claims, 5 Drawing Figures

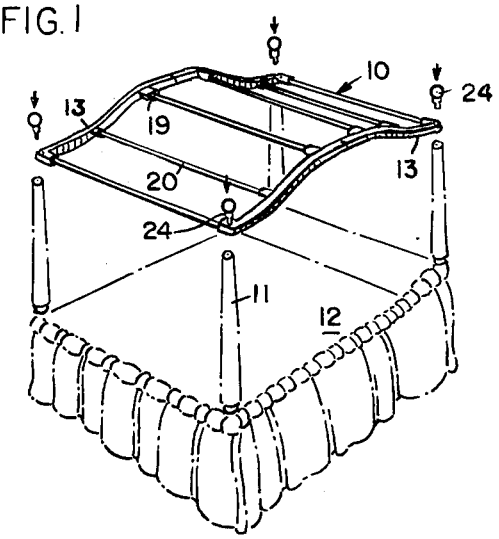
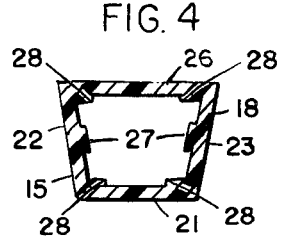
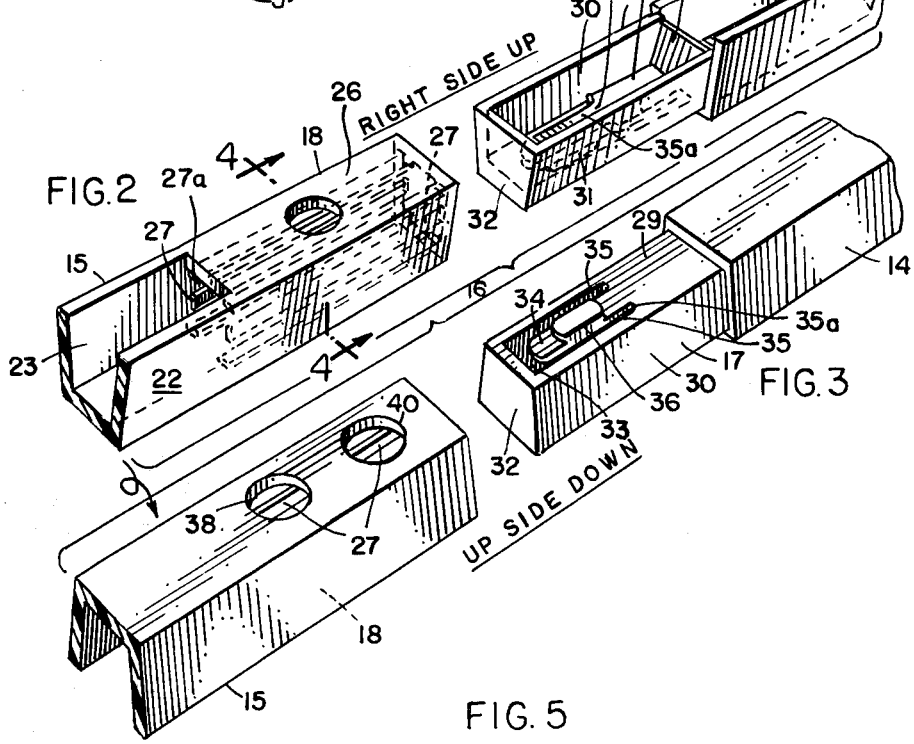
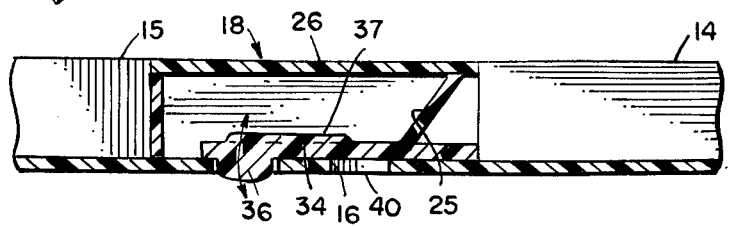

CANOPY FRAME FOR BED

This application is a continuation-in-part of my copending application Ser. No. 631,042, filed Nov. 12, 1975 now U.S. Pat. No. 4,004,306.

BACKGROUND AND SUMMARY OF INVENTION:

The instant invention is an improvement on the knockdown canopy support described in my prior U.S. Pat. No. 3,741,225. In that patent, the longitudinal members were channel shaped and, as here, each longitudinal member included two parts telescopically related. The arrangement of these parts in the prior patent lacked suitable strength, particularly in the telescopic connection.

The instant invention provides an improved telescoping connection in the longitudinal members through the use of unique reinforcing ribs, sized and placed for advantageous operation particularly when the parts of each longitudinal member are generally trapezoidal in cross-section. Other advantages and distinctive features may be seen in the details of the ensuing specification.

DETAILED DESCRIPTION OF INVENTION:

The invention is described in conjunction with an illustrative embodiment in which:

FIG. 1 is a perspective view of the inventive canopy frame shown associated with a bed in phantom line;

FIG. 2 is an enlarged exploded fragmentary perspective view of the telescopic connection of the longitudinal side members of the inventive frame;

FIG. 3 is a perspective view of the parts of the invention seen in FIG. 2, but inverted;

FIG. 4 is an enlarged sectional view taken along the line 4—4 of FIG. 2; and

FIG. 5 is a fragmentary longitudinal sectional view of the telescopic connection.

In the illustration given, the numeral 10 designates generally the inventive frame which is seen to be installed on upstanding bedposts as at 11. The bedposts 11 are provided at the four corners of the frame of the usual bed 12.

As indicated in my prior U.S. Pat. Nos. 3,311,118 and 3,741,225, beds come in nominal sizes of about 39 inches wide and 54 inches wide. However, there is no exact standard for widths, and manufacturers depart from the nominal widths in many instances, over a range of about 2 inches. The inventive canopy frame is adjustable both in its width and length to accommodate departure from nominal size.

The frame 10 includes right and left longitudinal members 13. More precisely, each longitudinal member 13 is made up of two parts or sub-members 14 and 15 which are telescopically interconnected at the area or point 16 (see FIGS. 2 and 3). In the illustration given, the longitudinal sub-member 14 is equipped with a male fitting 17 which is received within the female fitting 18 of the sub-member 15.

Each member 13 is equipped with a plurality of receptacle means 19 in the form of integral sleeves which receive the ends of cross-tie rods 20 (see FIG. 1). These are advantageously of the construction shown in my co-pending application Ser. No. 631,042, filed Nov. 12, 1975 and the disclosure thereof is hereby expressly incorporated herein.

Referring now to FIG. 2, it will be seen that each of the parts 14 and 15 is essentially trapezoidal in cross-section being made up of a bottom wall 21 (relative to the part 18 in FIG. 4) and upstanding angularly related sidewalls 22 and 23. This trapezoidal cross section exists for the length of each part 14 and 15 although the depth may be somewhat diminished at the ends receiving the finials 24 (see FIG. 1). A specific, preferred form of the end portions can be seen in my copending application Ser. No. 631,042 filed Nov. 12, 1975. Additionally, the sidewalls 22 and 23 are further integrated by means of transverse walls as shown in greater detail in my co-pending application mentioned above. The transverse walls (not shown here) are generally perpendicular to the bottom wall 21 although in some instances they may be angled as at 25 in the part 14 (see the upper right hand portion of FIG. 2). The part 14 is advantageously open-topped over its entire length whereas the part 15 has a partial top wall as at 26 (compare FIGS. 2 and 4) to develop the female fitting 18.

The parts 14 and 15 are advantageously constructed of high strength resilient plastic material and it has been found that for precision high speed production a draft or angularity in the relationship of the sidewalls 22 and 23 is advantageous. The draft of angularity is of the order of 8°, yielding the above referred to trapezoidal configuration.

Through the introduction of the advantageous draft or trapezoidal configuration referred to above, difficulties have been encountered in developing a secure, reliable telescopic connection between the parts 14 and 15. These parts are only anchored at their remote ends by the newel posts 24 and since they have substantial length — in excess of 6 feet, any shock could rupture or otherwise impair the telescopic connection. I have found that this adverse possibility can be substantially avoided through the introduction of longitudinally extending ribs as at 27 on the inside of the angled sidewalls 22 and 23. Additional ribs 28 are provided in the four corners — see FIGS. 2 and 4. These ribs not only rigidify the female fitting 18 but create a compressive stress for the male fitting 17 in addition to compensating for any departure from a true fit. It will be appreciated that in the holding techinque employed for the manufacture of these parts, a tolerance plus or minus is required and, at high volume production, as assembly may utilize parts at the extreme of the tolerance range.

Cooperating with the female fitting 18 just described, is the male fitting 17 which is made up of a partial bottom wall 29 and side walls 30 and 31. Further, the bottom and side walls are integrated at the end of the male fitting 17 by means of an end wall 32. This end wall 32 stabilizes the side walls during the telescoping connection.

The bottom wall 28 is apertured as at 33 (see FIG. 3) to provide a tongue 34. The aperture 33 extends away from the wall 31 in the form of slots 35 to develop a tongue length which is only slightly greater than the length of the detent or button portion 36. For example, with a male fitting portion 17 having a length of 2½ inches, the length of the slots 35 is about 1⅛ inches, the tongue 34 having a length of 1 inch and the oblong button 36 having a length of ½ inch. Additionally, the tongue 34 is further rigidified and stabilized by means of an upstanding rib running the length of the tongue and further into the bottom wall 29 as at 37 (compare FIGS. 2 and 5). In the illustration given, the rib 37 has a length of the order of 1⅛ inches. Further, the slots 35 at their distal end, i.e., remote from the wall 32, are each equipped with a radius as at 35a (see FIG. 3) so as to avoid the development of fracture stresses at the base of the tongue 34.

For resiliently interlocking the male and female fittings, the female fitting 18 is equipped with circular openings as at 38 and 40 which permit selective introduction of the oblong button 36 and thus accommodate the longitudinal members 13 to different length beds.

I claim:

1. A canopy bed frame comprising two longitudinal members and a plurality of lateral members adapted to be interconnected adjacent the ends thereof to said longitudinal members to form a generally rectangular ladder-like frame, each longitudinal member including a pair of end-connected parts to form an arched side of said frame, each longitudinal member part being constructed of resilient plastic material and having bottom and side walls arranged to provide a generally trapezoidal shape in cross section, one part of each longitudinal member at the end thereof having a male fitting telescopically received in the adjacent end of the other longitudinal member part, the other longitudinal part at said adjacent end having a top wall cooperating with said bottom and side walls in defining a female fitting, the walls of said female fitting having longitudinally extending inwardly directed integral ribs, said male fitting having an end wall stabilizing the side walls adjacent thereto for engagement with said ribs, and resilient lock means interconnecting said male and female fittings against inadvertent detachment.

2. The structure of claim 1 in which said male fitting bottom wall is equipped with a slot-like aperture providing a longitudinally extending tongue, said tongue being equipped with an inwardly facing rib, said rib extending longitudinally beyond the base of said tongue and away from said end wall.

3. The structure of claim 2 in which the slots of said aperature have a length substantially less than the length of said male fitting.

4. The structure of claim 3 in which said slots are equipped with radiuses at the tongue base.

5. The structure of claim 2 in which said tongue is equipped with elongated button means on the outer surface thereof for cooperation with a plurality of longitudinally spaced apart button receiving openings in said female fitting bottom wall.

6. The structure of claim 1 in which said female fitting has four internal corners defined by said top, bottom and side walls, and additional rib means integral with said walls in said four corners.

7. A canopy bed frame comprising two longitudinal members and a plurality of lateral members adapted to be interconnected adjacent the ends thereof to said longitudinal members to form a generally rectangular ladder-like frame, each longitudinal member including a pair of end-connected parts to form an arched side of said frame, each longitudinal member part being constructed of resilient plastic material and having bottom and side walls arranged to provide a generally trapezoidal shape in cross section, one part of each longitudinal member at the end thereof having a male fitting telescopically received in the adjacent end of the other longitudinal member part, the other longitudinal part at said adjacent end having a top wall cooperating with said bottom and side walls in defining a female fitting, the side walls of said female fitting having longitudinally extending inwardly directed integral ribs midway the height thereof and further rib means at the intersections of said side walls with said top and bottom walls, said male fitting having an end wall stabilizing the side walls adjacent thereto for engagement with said ribs, and resilient lock means interconnecting said male and female fittings against inadvertent detachment.

* * * * *